United States Patent
Schmidt et al.

(10) Patent No.: US 9,537,444 B2
(45) Date of Patent: Jan. 3, 2017

(54) METHODS AND SYSTEMS FOR CHARACTERIZING PHOTOVOLTAIC CELL AND MODULE PERFORMANCE AT VARIOUS STAGES IN THE MANUFACTURING PROCESS

(71) Applicant: Tau Science Corporation, Hillsboro, OR (US)

(72) Inventors: John M. Schmidt, Oakland, CA (US); Gregory S. Horner, Hillsboro, OR (US); Leonid A. Vasilyev, Beaverton, OR (US); James E. Hudson, Portland, OR (US); Kyle Lu, Tigard, OR (US)

(73) Assignee: Tau Science Corporation, Hillsboro, OR (US)

( * ) Notice: Subject to any disclaimer, the term of this patent is extended or adjusted under 35 U.S.C. 154(b) by 133 days.

(21) Appl. No.: 14/561,667

(22) Filed: Dec. 5, 2014

(65) Prior Publication Data
US 2015/0084664 A1    Mar. 26, 2015

Related U.S. Application Data

(63) Continuation-in-part of application No. 14/253,578, filed on Apr. 15, 2014, now abandoned.

(60) Provisional application No. 61/813,168, filed on Apr. 17, 2013.

(51) Int. Cl.
*H02S 50/10*    (2014.01)

(52) U.S. Cl.
CPC .................................. *H02S 50/10* (2014.12)

(58) Field of Classification Search
None
See application file for complete search history.

(56) References Cited

U.S. PATENT DOCUMENTS 3,748,579 A * 7/1973 Henry ................ G01R 31/2656
257/463
6,005,252 A * 12/1999 Forrest .................. C09K 11/06
250/458.1

* cited by examiner

*Primary Examiner* — Paresh Patel
(74) *Attorney, Agent, or Firm* — Lumen Patent Firm

(57) ABSTRACT

A method of quantum efficiency (QE) photovoltaic measurement is provided that includes coupling measurement electronics to a p-n junction of a Cell Under Test (CUT) that are capable of measuring a pulsed DC photocurrent. The measurement electronics output a response by the CUT to turning on and turning off the pulsed DC photocurrent that are digitized and analyzed for the magnitude that is representative of a conversion efficiency of the CUT to a wavelength of the DC photocurrent, where a measured decay time represents the p-n junction or the minority carrier lifetime. The CUT is exposed to the pulsed DC photocurrent, where signatures of the response to turning off and on to the pulsed DC photocurrent overlap, where a combined amplitude of the response is proportional to an efficiency of a production of photocarriers, where a value of a spectral response at a wavelength is determined.

42 Claims, 2 Drawing Sheets

METHODS AND SYSTEMS FOR CHARACTERIZING PHOTOVOLTAIC CELL AND MODULE PERFORMANCE AT VARIOUS STAGES IN THE MANUFACTURING PROCESS

CROSS-REFERENCE TO RELATED APPLICATIONS

This application is a continuation-in-part of U.S. patent application Ser. No. 14/253,578 filed Apr. 15, 2014, which is incorporated herein by reference. U.S. patent application Ser. No. 14/253,578 claims priority from U.S. Provisional Patent Application 61/813,168 filed Apr. 17, 2013, which is incorporated herein by reference.

FIELD OF THE INVENTION

The current invention generally relates to systems and methods used in the characterization of Photovoltaic (PV) systems. More specifically, the invention relates to systems and methods that provide the ability to extract additional parameters from a cell and to characterize strings and modules using contact and non-contact methods.

BACKGROUND OF THE INVENTION

Methods and systems for measurement of the Quantum Efficiency (QE) and Current Voltage Characteristic (IV or JV) of photovoltaic devices have been available for decades. The methods employ the use of a light source producing a broad spectrum followed by either a monochromator or filter wheel to generate a set of wavelengths used to probe the desired spectral response of the photovoltaic Cell Under Test (CUT). These methods are hereafter referred to as the "traditional method".

Recently, fast methods for measuring the QE of a cell have been developed and made commercially available. However, these methods require electrical contact to the cell and cannot be applied directly to PV strings or modules, or to partially completed cells.

What is needed is a contact-free QE measurement method that can be applied directly to PV strings or modules, or to partially completed cells.

SUMMARY OF THE INVENTION

To address the needs in the art, a sequential method of quantum efficiency (QE) photovoltaic measurement is provided that includes using a plurality of DC or pulsed light sources directed at the p-n junction of a Cell Under Test (CUT), where each the DC or pulsed light source emits a controlled pulse of quasi-monochromatic light, where the output of each the DC or pulsed light source has a unique wavelength, where the response of the CUT is detected by coupling measurement electronics that are capable of measuring a DC or pulsed DC photocurrent from the CUT, where the measurement electronics output a response by the CUT to turning on the pulsed light or DC sources and a response by the CUT to turning off the pulsed or DC light sources, where the response by the CUT to turning on the pulsed or DC light sources is digitized and analyzed and the response by the CUT to turning off the pulsed or DC light sources is digitized and analyzed, where the magnitude of the CUT response is representative of a conversion efficiency of the CUT to a wavelength of the pulsed or DC light source, where a measured decay time of the CUT response is analyzed using an appropriately programmed computer to extract a decay time or leakage current of the p-n junction. The method further includes exposing the CUT to the pulsed or DC light source, using an illumination source having a plurality of DC or pulsed quasi-monochromatic light sources, where signatures of the response by the CUT to turning on each the pulsed or DC light source and the response by the CUT to turning off each the pulsed or DC light source overlap, where a combined amplitude of the response by the CUT to turning on the pulsed or DC light source and the response by the CUT to turning off the pulsed or DC light source is proportional to an efficiency of a production of photocarriers in the CUT, where a value of a spectral response or Quantum Efficiency (QE) of the CUT at a wavelength of the illumination source is determined.

In one aspect of the invention, the illumination source includes a set of LED or laser sources of different wavelengths.

In one embodiment of the invention, the illumination source is modulated. In one aspect of the current embodiment, the illumination source includes a light engine probe, where the light engine probe includes a set of LED sources of different wavelengths, where light from each LED source includes AC modulated light at a dedicated frequency, where the AC modulated light from each LED source is combined and directed at the CUT. Here, the measurement electronics include an electronic amplifier, an appropriately programmed computer, and a digitizer, where the appropriately programmed computer is capable of analyzing the spectral response using a fast Fourier transform to determine a contribution by each wavelength to the photocurrent. In a further aspect, the light probe is configured to form a focused spot. In another aspect the light probe is configured for scanning by moving the CUT on a stage. In another aspect, the light probe is configured to illuminate an entire area of the CUT, where an average spectral response for the CUT is determined. In another aspect of the current embodiment, a local current-voltage characteristic (JV) for the CUT is provided by supplying a DC voltage bias to the CUT and measuring both the DC and an AC current of the CUT. Here, the CUT is set to a voltage bias $V_0$, where measured QE data is combined with a test spectrum that is characteristic of a spectrum incident on the CUT during normal operation, where an expected current per unit area that the CUT can produce is measured when subjected to conditions that are representative of the test spectrum used when the voltage across the device is equal to $V_0$, where the bias voltage is then set to $V_1$, and the measured QE data is combined with the test spectrum and the CUT is measured for the expected current, where a set of voltage bias values $\{V_0, V_1, \ldots, V_N\}$ are used for measuring the expected current, where the set of the bias values can be zero, positive and negative bias values. In a further aspect, a shape of a resulting J-V curve is analyzed to extract a local series resistance, a shunt resistance, conversion efficiency, Voc, Jsc, or a fill factor. In another aspect of the current embodiment, the measurement electronics include a non-contacting sensor selected from the group consisting of a capacitive non-contact sensor, a metallic plate disposed proximal to a surface of the CUT, a Transparent Conducting Oxide (TCO) film on a transparent substrate, an inductive non-contact sensor, a luminescence sensor, and a microwave non-contact sensor. Here, a light probe is used to produce photocarriers, where the photocarriers are modulated similar to a modulation of light generated by a light probe, where the modulated photocarriers couple according to the capacitance of the capacitive non-contact sensor and generate a signal, where the signal is measured by the measurement electronics and processed to extract data that is representative of the QE of the CUT. In another aspect of the current embodiment, the inductive non-contact sensor includes an eddy-current detection device, where an oscillating magnetic field generated by a coil in the eddy-current detection device induces eddy current fields in the CUT, where a magnitude of the induced eddy currents are measured using readout electronics. Here, the luminescence non-contact sensor includes a photosensor that detects luminescence from the CUT. Further, a filter is placed in front of the photosensor so that only photons near the bandgap of the CUT are detected by the photosensor, and higher-energy photons used in the stimulation of the photoresponse are unable to reach the photosensor. In another aspect, the microwave non-contact sensor includes a microwave generator and detector configured as a non-contact sensor of microwave reflectance, transmittance, or microwave reflectance and transmittance, where the microwave non-contact sensor is capable of indicating photoconductivity of the CUT, where the photoconductivity is modulated in response to modulation of a light probe incident on the CUT, where a signal from sensor readout electronics is fed into probe measurement electronics and processed to extract data, where the extracted data represents the QE of the CUT. According to a further aspect of the current embodiment, the CUT includes a partially completed photovoltaic cell, where the partially completed photovoltaic cell includes a formed p-n junction, where metallization steps forming contacts on the partially completed photovoltaic cell have not been preformed. In yet another aspect of the current embodiment, a contact to the CUT includes a rolling conducting contact when the CUT already has one or more metal contacts established, where the rolling contact is connected to the QE measurement electronics. In one aspect of the current embodiment, the measurement electronics comprise temporary contact measurement electronics, where the temporary contact measurement electronics have brush contact measurement electronics, rolling contact measurement electronics, or sliding contact measurement electronics. In another aspect of the current embodiment, a region within the CUT is tested, where positive and negative output leads of a string of photovoltaic cells arranged in series are connected to the measurement electronics, where a DC bias voltage is applied to the string of the photovoltaic cells, where a DC current and a pulsed or AC current are measured, where a DC light bias system is used to illuminate all the photovoltaic cells in the string of the photovoltaic cells at an illumination that is less than an illumination of the individual photovoltaic cells under test, where the CUT becomes a current limiting device in the string of the illuminated photovoltaic cells. Here, according to one aspect, a separate DC light bias is directed to be coincident with the location of the QE measurement of the CUT, where the second light bias fills traps capable of inducing a QE response to be non-linear at weak illumination levels. In yet another aspect of the current embodiment, the light probe is configured to form a focused spot. In one aspect, the light probe is configured for scanning by moving the CUT on a stage. In a further example of the current embodiment, the light probe is configured to illuminate an entire area of the CUT, where an average spectral response for the CUT is determined.

DETAILED DESCRIPTION

Figure 1:
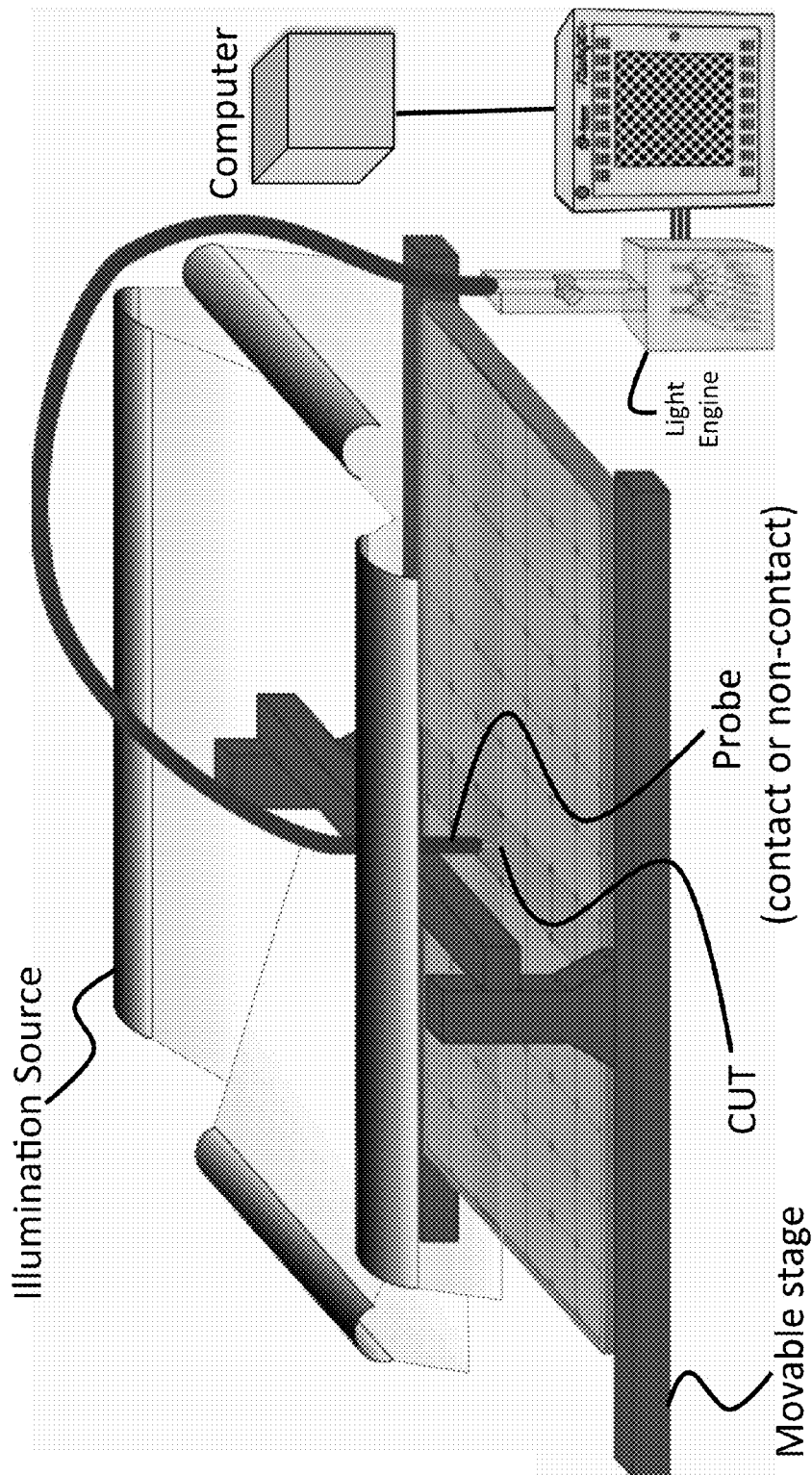
FIG. 1 shows an illuminator configuration, which illuminates entire module except for the Cell Under Test, according to one embodiment of the invention.

According to the current invention, a cell is a single photovoltaic device, a string is a set of cells electrically connected in series and physically arranged in a linear or two-dimensional array, and a module is a completed photovoltaic unit. Typically the term string is used to describe the array of cells, which are connected but not yet mounted in a completed module, and therefore represents an intermediate step in the module assembly process.

According to one embodiment, a light engine probe having a set of LED sources of different wavelengths is used. The light from each LED is either pulsed or modulated at a unique frequency, and the light from the LEDs is combined and directed at the CUT. The photocurrent generated by the cell is amplified and converted to voltage by an electronic amplifier and digitized, then analyzed by fast Fourier transform to determine the contribution of each source to the photocurrent, thus determining the spectral response of the cell under test. The light probe is configured such that the light forms a small spot suitable for high resolution measurements or scanning (as by moving the CUT on a stage in one embodiment), or such that it illuminates the entire area of the CUT (providing an average spectral response for the CUT), or any desirable configuration in between. This system will hereafter be referred to as the "standard light probe" and "standard detection" method.

Turning now to local current-voltage characteristic determination, the traditional and standard methods for measuring QE are improved on by using a method and devices to determine a local current-voltage characteristic (JV) for the CUT. Here, "local" generally means the characteristic pertaining to the region approximately the size of the light probe. The method according to the current embodiment is as follows:

The CUT is loaded into a QE measurement system.
This system could be a traditional QE system or a standard fast QE system.
The system could also be a QE system using the Fast Sequential Spectral Characterization method (described below).
The system provides electrical measurement circuitry connected to the CUT, which can supply a DC voltage bias to the CUT and measure both DC and AC current of the CUT.
The CUT is set to a particular voltage bias $V_0$. The QE is measured according to the typical system operation.
The measured QE data is then combined with a spectrum representative of the spectrum that would be incident on the CUT during normal operation. For example, the standard spectrum AM1.5 would be representative of sunlight on incident on a PV module on earth. Note that other spectra may be more appropriate for other conditions, such as operation in space, or operation in cloudy conditions, or operation at a particular time of day in a particular cloud condition at a particular latitude and altitude/azimuth setting of the module.

The result of the computation is the current per unit area that the CUT can be expected to produce when subjected to conditions representative of the spectrum used, when the voltage across the device is equal to $V_0$.

The bias voltage is then set to a new value $V_1$, and the steps are repeated.

The steps are repeated further for a full set of voltage bias values $\{V_0, V_1, \ldots, V_N\}$. At each bias voltage a new photocurrent, J, is calculated from the integral vs. wavelength ($\lambda$) of [Quantum Efficiency($\lambda$)*Incident Spectrum($\lambda$)*d$\lambda$]: Note that the set of voltage values can include zero and both positive and negative bias values.

The shape of the resulting J-V curve can then be further analyzed to extract the local series resistance, shunt resistance, fill factor, device efficiency, Voc, Jsc, etc. Spatial maps of these results may be displayed to the user or automatically analyzed for specific failure patterns.

The resulting data can be assembled to represent the expected current produced at each voltage bias value, which is the current-voltage characteristic for the probed site. This data is available for each region of the CUT that was probed in this manner. In the case where the method was repeated over a region of the CUT, for example by scanning the probe with the use of a stage, the data becomes a position-dependent map of the current-voltage characteristic of the CUT. While such a map may be obtained using a traditional QE system, it is extremely time consuming, which renders the method somewhat impractical. However, using a standard fast QE system or a Pulsed Fast Sequential Spectral Characterization system, this data can be readily generated.

Turning now to non-contact methods for spectral characterization of photovoltaics, in many cases it is desirable to obtain spectral characteristics of a photovoltaic device without making electrical contact with the device. The standard system may be modified or extended by replacing the contacting current amplifier by a non-contacting sensor. Some exemplary embodiments are presented here:

A capacitive non-contact sensor may be used.

The capacitive sensor may be a metallic plate that is located in proximity to the surface of the photovoltaic device, or it could be a conductor, which transmits light at the wavelengths used by the light probe, such as a Transparent Conducting Oxide (TCO) film on a transparent substrate. The transparent conductor allows the option of transmitting the light of the probe through the conductor, thereby co-locating the probe and the sensor. In both cases, the conductor is connected to the system measurement electronics.

A light probe is used to produce photocarriers, which are modulated in a manner similar to the modulation of the light generated by the light probe. The modulated photocarriers couple via the capacitance of the sensor and generate a signal, which is measured by the measurement electronics and processed to extract data that is indicative of the QE of the CUT. The data processing methods are similar to those employed in the case of a contacting measurement.

An inductive non-contact sensor may be used.

The inductive sensor used may be an eddy-current detection device. The principle of operation is to induce eddy current fields in the CUT by applying an oscillating magnetic field generated by a coil. The same coil, or an alternate pickup coil, may be used to determine the magnitude of the induced eddy currents using readout electronics. The oscillation frequency may typically be in the range of 10 kHz to 100 MHz, which may affect the depth of sensitivity of the measurement within the CUT. The amplitude of the eddy current detected is indicative of the photoconductivity of the CUT, which in turn is modulated in response to the modulation of the light probe incident on the CUT. The signal from the sensor readout electronics is fed into probe measurement electronics and processed to extract data, which is indicative of the QE of the CUT. The data processing methods are similar to those employed by the standard system in the case of a contacting measurement.

A microwave non-contact sensor may be used.

The microwave sensor may indicate the photoconductivity of the CUT, which in turn is modulated in response to the modulation of the light probe incident on the CUT. The signal from the sensor readout electronics is fed into probe measurement electronics and processed to extract data, which is indicative of the QE of the CUT. The data processing methods are similar to those employed by the standard system in the case of a contacting measurement. The microwave sensor may be a resonator whose resonance amplitude is related to the photoconductivity of the CUT.

Photoluminescence techniques may also be used.

In all cases of choice of sensor type, the light probe may be the standard probe or the Fast Sequential Spectral Characterization probe (described below).

The light probe and any of the three-detector sensor choices outlined above do not necessarily need to be co-located. This allows the possibility of scanning the light probe relative to the CUT while keeping the detection sensor fixed relative to the CUT.

Turning now to the spectral characterization of partially completed photovoltaic cells, where the standard fast QE system is typically used on completed PV cells, but the system and method may be extended to perform measurements on partially completed PV cells. This includes, but is not limited to, a cell where the p-n junction (or junctions) has (have) been formed, but metallization steps forming contacts have not yet been performed. In such cases, a system may be developed to provide a temporary contact to the CUT, where some exemplary embodiments include:

A rolling conducting contact may be employed to form one or both required contacts to the CUT. This rolling contact is connected to the QE measurement electronics.

A brush or other sliding contact may be employed to form one or both required contacts to the CUT. This brush or sliding contact is connected to the QE measurement electronics.

The temporary contact methods may be applied to discrete incomplete PV cells.

The temporary contact methods may be applied to sheets of PV material such as that produced by a roll-to-roll process.

The temporary contact methods may be applied to PV material that will be further processed to produce smaller cells in the completed module.

The non-contact methods described above may also be applied to partially completed PV material. The probe used in these cases may be the standard probe or the Fast Sequential Spectral Characterization probe.

Figure 2:
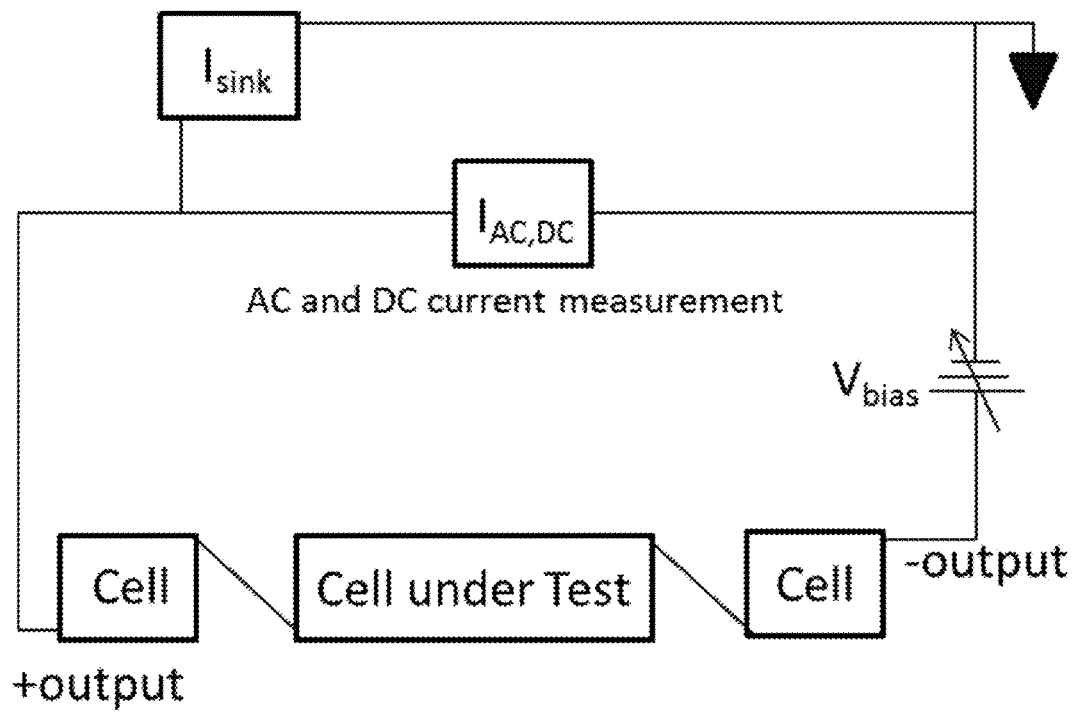
FIG. 2. shows a string composed of three cells and the measurement system, comprising: an adjustable power supply to apply the string bias ($V_{bias}$), an AC/DC current measurement system to measure the modulated photocurrent output ($I_{AC}$) and DC current from the string, and a DC current sink to offset the majority of the DC string current ($I_{sink}$). Because the CUT is intentionally made to be the current limiting device, $I_{DC}$ may be monitored to determine when the CUT is at zero applied bias ($V_{cut}=0$ when $I_{Dc}=0$).

The characterization of cells in series (e.g. a string or module) presents a challenge because the AC photocurrent generated must pass through all devices. A method has been developed to circumvent this problem, which allows a CUT, or region within the CUT, to be tested. The main features of this embodiment are the following:

- The +/− outputs of the string are connected to measurement electronics, which apply a DC bias voltage, $V_{bias}$, and measure both DC and AC current ($I_{DC}$, $I_{AC}$: see FIG. 2).
- In some cases, an additional current sink is added to oppose or 'null' the string DC current. This reduces the DC current component flowing through the AC/DC current detector (often a necessity when transimpedance amplifiers are used for AC current detection).
- A DC light bias system is used to illuminate all cells in the string or module, but the illumination of the CUT is intentionally made less than the illumination of every other cell—the CUT is thus the current limiting device in the string of series-connected cells. In addition, a separate DC light bias is directed to be coincident with the location of the QE measurement—this second light bias is used to fill traps that would cause the QE response to be non-linear at weak illumination levels. It is usually of more interest to measure the QE either at strong illumination levels, or to at least suppress the trapping effects with a moderate DC light bias so that the measurement results are similar to those that would be measured at strong illumination levels. In all cases, the total DC illumination of the CUT must be controlled so that the CUT is the current limiting device in the string.
- The bias voltage is first set to zero Volts, holding the string at short circuit, and the DC light bias is turned on, generating a DC current. The DC current is typically small, because it is limited by the leakage current of the reverse biased CUT. The bias voltage is then adjusted until the DC current reaches a value corresponding to the desired CUT operating current. For example, if we wish to measure the QE at zero applied bias, then $V_{bias}$ is adjusted until $I_{DC}=0$: when leakage current is zero, the CUT is experiencing zero applied voltage. As a second example, if we wish to operate the CUT at +1 Amp operating condition, then $V_{bias}$ is adjusted until $I_{DC}=1$ A.
- It may be verified that the CUT continues to be the current limiting device at each new bias condition—this may be accomplished by several techniques:
  - 'wobble' or slightly adjust the local light intensity over each cell. Cells that are not current limiting will not modulate the $I_{DC}$ of the string. Only one cell, the CUT, should exhibit current limiting behavior.
  - Observe clipping of the $I_{AC}$, the photogenerated AC current. Clipping will indicate that the CUT is no longer the current limiting device.
- The external current supply, $I_{sink}$, can be used to offset or 'null' the CUT DC current so that the AC photocurrent, $I_{AC}$, may be measured more accurately and with lower noise. For instance, if the AC current amplifier is only capable of reading up to 100 mA DC current prior to saturation, and the CUT current is 1 A under illumination, then an offset current of ~900-1000 mA may be applied to allow measurement of $I_{AC}$.
- In both cases impact of the impedance of the bias voltage source shall be taken into account. The impedance of the bias voltage source must be much less than the input impedance of the AC current measurement electronics in the frequency domain of interest (including DC if DC measurements are performed). For instance, if the QE measurement is performed with 1 kHz modulated light, and the input impedance of the AC current measurement system at 1 kHz is 0.3 Ohms, then the bias voltage source input impedance shall be chosen to be <<0.3 Ohms at 1 kHz.
- If the bias supply impedance approaches the impedance of the AC current measurement system for the desired measurement conditions, then the effect may be mathematically modeled to calculate and correct for the effect on the resultant QE measurement.
- A spectral light probe is then used to characterize the response of the CUT. Because the CUT is the current-limiting device, its AC photoresponse is measured at the output of the string.
- This probe may be the standard light engine, and the generated AC current is analyzed in the standard manner and the spectral response of the CUT is extracted.
- The probe may be the Fast Sequential Spectral Characterization probe described above. The generated AC current is analyzed in the corresponding manner and the spectral response of the CUT is extracted.
- Both probe types may be configured to have an illuminated area, which ranges from small (approximately 1 mm diameter) to the full area of the CUT. The shape of the probe illumination may include a linear configuration.
- The probe may be scanned or stepped laterally relative to the CUT to obtain position-dependent information about the CUT.
- The scanning may be accomplished by moving the string or module relative to the light probe.
- The scanning may be accomplished by moving the light probe on a gantry relative to the string or module.
- The scanning may be accomplished by steering the light probe from a moving mirror.
- The scanning may be accomplished by a combination of the above motions, for example moving the string or module in one axis and the light probe in another.

The above methods may be applied to one or more of the cells in the module under test. The selection of cells may be pre-programmed, or may be selected by an operator while under test, or may be selected dynamically based on results already obtained.

The light bias system may include one or more illuminators mounted on a mechanism for aiming the light incident on the module or string. One strategy would be to provide a reasonably sharp shadow edge cast on the module. Four illuminators so arranged could cover all but the CUT. FIG. 1 shows one embodiment of the current invention. For a thin-film type module where the individual cells include long strips, two illuminators may suffice. Another embodiment is to mask off the CUT by covering the CUT or otherwise blocking the bias light from falling upon it. A third embodiment is to control an array of individual light sources aligned with or projected upon the array of cells in the string. The intensity of the light sources would be intentionally manipulated so that the CUT receives a lesser DC light intensity than all of the other cells in the string, thus rendering it the current-limiting device. In all cases, to select the CUT, the module may be moved relative to the illuminator, or the illuminator may be moved or reconfigured, or a combination method may be used.

Regarding determining the voltage bias of the $n^{th}$ cell in a string, various approximations may be used to set the string bias voltage during the CUT QE measurement that include:

- Applying a bias voltage=$V_{oc}*(M-1)/M$, where M is the number of cells in the module, where it is assumed that all cells have equal Voc, and that the cell operating voltage is $V_{oc}$ in actual operation.

While illuminating one cell with AC modulated monochromatic light, sweep the applied bias from $V_{oc}$ towards 0 Volts, and choose the bias voltage that results in the largest ac photoresponse, where peak photoresponse does not always occur at 0V cell bias, for example a red response may increase in reverse bias when diffusion length is short due to improved base carrier collection.

The current invention addresses these shortcomings by directly measuring the potential drop across the CUT using one or more Kelvin probes or other non-contact voltmeters. Consider the example of a string of cells, and while the string is under both DC light and DC voltage bias perform one of the following measurements:

Using a single probe, make sequential measurements of the surface potential of two neighboring cells. Because the cells are wired in series, the surface potential of one cell is identical to the rear surface potential of its neighbor. The difference in these surface potential measurements is the voltage drop across one of the cells.

Using two non-contact voltmeters to simultaneously measure the front and backside potentials of a single cell. The voltage difference is the voltage drop across the cell.

Using a 'tuning fork' non-contact voltmeter positioned so that at one end of the motion it is over the nth cell and at the other end of the motion it is over the $n+1^{th}$ cell. The potential difference reported by this tuning fork probe is the voltage drop across the cell.

Similar techniques can be used to measure surface potential, using rotary Kelvin probes, etc.

Land high impedance voltage probes on the surface of two neighboring cells to directly measure the voltage drop across a single cell.

In all cases, the 'single cell' is the CUT, and the external bias is adjusted either manually or automatically until the measured CUT voltage reaches the intended value. These methods avoid the approximations previously described in the literature.

If all cells in a string or module are exposed to uniform light bias, then all cells are safely forward-biased. However, if one cell is intentionally shaded or partially shaded while the string is held at short circuit condition, then that cell is reverse biased. Individual cells may be unable to survive this reverse bias condition due to localized defects, and may become damaged. For the QE measurement, it is necessary to at least partially shade the CUT so that it becomes the current limiting device, and so this effect must be considered.

To solve this problem, an Algorithm to automatically prevent cell damage during the application of external biases to a series-connected string or module is provided, where the algorithm is employed to simultaneously ramp the DC light bias intensity on the string and, using either the approximations or the direct measurement of the voltage drop across the CUT as described in above, adjust the DC voltage bias, $V_{bias}$, to maintain the CUT voltage drop within a safe zone, for example on Silicon junctions −4V to 0.7V. This same algorithm may be used to set the cell bias condition to an arbitrary value for the purpose of obtaining a local JV curve, as described previously. The algorithm may, for instance, be used to sweep the bias from reverse bias to Voc (say, −4V to +0.7V on a typical silicon cell) while simultaneously acquiring a series of QE curves. The local current output, J, may then be calculated from each QE curve, and the result plotted vs the measured or approximated cell voltage, V.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, replacing the array of LED light sources with an array of filtered broadband sources, scanning the beam by using a moveable mirror, or using a tunable supercontinuum laser instead of an array of LED light sources.

All such variations are considered to be within the scope and spirit of the present invention as defined by the following claims and their legal equivalents.

What is claimed:

1. A sequential method of quantum efficiency (QE) photovoltaic measurement, comprising:
    a. using a plurality of DC or pulsed light sources directed at the p-n junction of a Cell Under Test (CUT), wherein each said DC or pulsed light source emits a controlled pulse of quasi-monochromatic light, wherein the output of each said DC or pulsed light source comprises a unique wavelength, wherein the response of the CUT is detected by coupling measurement electronics that are capable of measuring a DC or pulsed DC photocurrent from said CUT, wherein said measurement electronics output a response by said CUT to turning on said pulsed or DC light sources and a response by said CUT to turning off said pulsed or DC light sources, wherein said response by said CUT to turning on said pulsed or DC light sources is digitized and analyzed and said response by said CUT to turning off said pulsed or DC light sources is digitized and analyzed, wherein the magnitude of said CUT response is representative of a conversion efficiency of said CUT to a wavelength of said pulsed or DC light source, wherein a measured decay time of said CUT response is analyzed using an appropriately programmed computer to extract a decay time or leakage current of said p-n junction; and
    b. exposing said CUT to said pulsed or DC light source, using an illumination source comprised of a plurality of DC or pulsed quasi-monochromatic light sources, wherein signatures of said response by said CUT to turning on each said pulsed or DC light source and said response by said CUT to turning off each said pulsed or DC light source overlap, wherein a combined amplitude of said response by said CUT to turning on said pulsed or DC light source and said response by said CUT to turning off said pulsed or DC light source is proportional to an efficiency of a production of photocarriers in said CUT, wherein a value of a spectral response or Quantum Efficiency (QE) of the CUT at a wavelength of said illumination source is determined.

2. The method according to claim 1, wherein said illumination source comprises a set of LED or laser sources of different wavelengths.

3. The method according to claim 2, wherein said illumination source is modulated, wherein a single light source is modulated to emit quasi-monochromatic light while no other light sources are modulated, or wherein two or more light sources are simultaneously modulated to emit more than one quasi-monochromatic beam.

4. The method according to claim 3, wherein said illumination source comprises a light engine probe, wherein said light engine probe comprises a set of LED sources of different wavelengths, wherein light from each said LED source comprises AC modulated light at a dedicated frequency, wherein said AC modulated light from each said LED source is combined and directed at said CUT.

5. The method according to claim 4, wherein said measurement electronics comprise an electronic amplifier, an appropriately programmed computer, and a digitizer, wherein said appropriately programmed computer is capable of analyzing said spectral response using a fast Fourier transform to determine a contribution by each said wavelength to said photocurrent.

6. The method according to claim 4, wherein said light probe is configured to form a focused spot.

7. The method according to claim 4, wherein said light probe is configured for scanning by moving said CUT on a stage.

8. The method according to claim 4, wherein said light probe is configured to illuminate an entire area of said CUT, wherein an average spectral response for said CUT is determined.

9. The method according to claim 3, wherein a local current-voltage characteristic (JV) for said CUT is provided by supplying a DC voltage bias to said CUT and measuring both said DC and an AC photocurrent of said CUT.

10. The method according to claim 9, wherein said CUT is set to a voltage bias $V_0$, wherein measured QE data is combined with a test spectrum that is characteristic of a spectrum incident on said CUT during normal operation, wherein an expected current per unit area, J, that said CUT can produce is measured when subjected to conditions that are representative of said test spectrum used when said voltage across the device is equal to $V_0$, wherein said bias voltage is then set to $V_1$, and said measured QE data is combined with said test spectrum and said CUT is measured for said expected current, wherein a set of voltage bias values $\{V_0, V_1, \ldots, V_N\}$ are used for measuring said expected currents $\{J_0, J_1, \ldots, J_N\}$, wherein said set of said voltage bias values comprises zero, positive and negative bias values and said set of expected currents represent the expected device current at the corresponding bias voltage.

11. The method according to claim 10, wherein a shape of a resulting J-V curve is analyzed to extract a local series resistance, a shunt resistance, conversion efficiency, $V_{oc}$, $J_{sc}$ or a fill factor.

12. The method according to claim 3, wherein said measurement electronics comprise a non-contacting sensor selected from the group consisting of a capacitive non-contact sensor, a metallic plate disposed proximal to a surface of said CUT, a Transparent Conducting Oxide (TCO) film on a transparent substrate, an inductive non-contact sensor, a luminescence sensor, and a microwave non-contact sensor.

13. The method of claim 12, wherein a light probe is used to produce photocarriers, wherein said photocarriers are modulated similar to a modulation of light generated by said light probe, wherein said modulated photocarriers couple according to the capacitance of said capacitive non-contact sensor and generate a signal, wherein said signal is measured by said measurement electronics and processed to extract data that is representative of said QE of the CUT.

14. The method of claim 12, wherein said inductive non-contact sensor comprises an eddy-current detection device, wherein an oscillating magnetic field generated by a coil in said eddy-current detection device induces eddy current fields in said CUT, wherein a magnitude of said induced eddy currents are measured using readout electronics.

15. The method of claim 12, wherein said luminescence non-contact sensor comprises a photosensor that detects luminescence from the CUT.

16. The method of claim 15, wherein a filter is placed in front of the photosensor so that only photons near the bandgap of the CUT are detected by the photosensor, and higher-energy photons used in the stimulation of the photoresponse are unable to reach the photosensor.

17. The method of claim 12, wherein said microwave non-contact sensor comprises a microwave generator and detector configured as a non-contact sensor of microwave reflectance, transmittance, or microwave reflectance and transmittance, wherein said microwave non-contact sensor is capable of indicating photoconductivity of said CUT, wherein said photoconductivity is modulated in response to modulation of a light probe incident on said CUT, wherein a signal from sensor readout electronics is fed into probe measurement electronics and processed to extract data, wherein said extracted data represents said QE of the CUT.

18. The method according to claim 3, wherein said CUT comprises a partially completed photovoltaic cell, wherein said partially completed photovoltaic cell comprises a formed p-n junction, wherein metallization steps forming contacts on said partially completed photovoltaic cell have not been preformed.

19. The method according to claim 3, wherein a contact to said CUT comprises a rolling conducting contact when said CUT already has one or more metal contacts established, wherein said rolling contact is connected to said QE measurement electronics.

20. The method according to claim 3, wherein said measurement electronics comprise temporary contact measurement electronics, wherein said temporary contact measurement electronics comprise brush contact measurement electronics, rolling contact measurement electronics, or sliding contact measurement electronics.

21. The method according to claim 3, wherein a region within said CUT is tested, wherein positive and negative output leads of a string of photovoltaic cells arranged in series are connected to said measurement electronics, wherein a DC bias voltage is applied to said string of said photovoltaic cells, wherein a DC current and a pulsed or AC photocurrent are measured, wherein a DC light bias system is used to illuminate all said photovoltaic cells in said string of said photovoltaic cells at an illumination that is more than an illumination of said individual photovoltaic cells under test, wherein said CUT becomes a current limiting device in said string of said illuminated photovoltaic cells.

22. The method according to claim 21, wherein a separate DC light bias is directed to be coincident with the location of the QE measurement of said CUT, wherein said second light bias fills traps capable of inducing a QE response to be non-linear at weak illumination levels.

23. The method according to claim 1, wherein said light probe is configured to form a focused spot.

24. The method according to claim 23, wherein said light probe is configured for scanning by moving said CUT on a stage.

25. The method according to claim 1, wherein said light probe is configured to illuminate an entire area of said CUT, wherein an average spectral response for said CUT is determined.

26. The method according to claim 1, wherein a local current-voltage characteristic (JV) for said CUT is provided by supplying a DC voltage bias to said CUT and measuring both said DC and an AC photocurrent of said CUT.

27. The method according to claim 26, wherein said CUT is set to a voltage bias $V_0$, wherein measured QE data is combined with a test spectrum that is characteristic of a spectrum incident on said CUT during normal operation, wherein an expected current per unit area, J, that said CUT can produce is measured when subjected to conditions is representative of said test spectrum used when said voltage across the device is equal to $V_0$, wherein said bias voltage is then set to $V_1$, and said measured QE data is combined with said test spectrum and said CUT is measured for said expected current, wherein a set of voltage bias values $\{V_0, V_1, \ldots, V_N\}$ are used for measuring said expected currents $\{J_0, J_1, \ldots, J_N\}$, wherein said set of said voltage bias values comprises zero, positive and negative bias values and said set of expected currents represent the expected device current at the corresponding bias voltage.

28. The method according to claim 27, wherein a shape of a resulting J-V curve is analyzed to extract a local series resistance, a shunt resistance, conversion efficiency, $V_{oc}$, $J_{sc}$ or a fill factor.

29. The method according to claim 1, wherein said measurement electronics comprise a non-contacting sensor selected from the group consisting of a capacitive non-contact sensor, a metallic plate disposed proximal to a surface of said CUT, a Transparent Conducting Oxide (TCO) film on a transparent substrate, an inductive non-contact sensor, a luminescence sensor, and a microwave non-contact sensor.

30. The method of claim 29, wherein a light probe is used to produce photocarriers, wherein said photocarriers are modulated similar to a modulation of light generated by a light probe, wherein said modulated photocarriers couple according to the capacitance of said capacitive non-contact sensor and generate a signal, wherein said signal is measured by said measurement electronics and processed to extract data that is representative of said QE of the CUT.

31. The method of claim 30, wherein said inductive non-contact sensor comprises an eddy-current detection device, wherein an oscillating magnetic field generated by a coil in said eddy-current detection device induces eddy current fields in said CUT, wherein a magnitude of said induced eddy currents are measured using readout electronics.

32. The method of claim 30, wherein said luminescence non-contact sensor comprises a photosensor that detects luminescence from the CUT.

33. The method of claim 32, wherein a filter is placed in front of the photosensor so that only photons near the bandgap of the CUT are detected by the photosensor, and higher-energy photons used in the stimulation of the photoresponse are unable to reach the photosensor.

34. The method of claim 30, wherein said microwave non-contact sensor comprises a microwave generator and detector configured as a non-contact sensor of microwave reflectance, transmittance, or microwave reflectance and transmittance, wherein said microwave non-contact sensor is capable of indicating photoconductivity of said CUT, wherein said photoconductivity is modulated in response to modulation of a light probe incident on said CUT, wherein a signal from sensor readout electronics is fed into probe measurement electronics and processed to extract data, wherein said extracted data represents said QE of the CUT.

35. The method according to claim 1, wherein said CUT comprises a partially completed photovoltaic cell, wherein said partially completed photovoltaic cell comprises a formed p-n junction, wherein metallization steps forming contacts on said partially completed photovoltaic cell have not been preformed.

36. The method according to claim 1, wherein a contact to said CUT comprises a rolling conducting contact when said CUT already has one or more metal contacts established, wherein said rolling contact is connected to said QE measurement electronics.

37. The method according to claim 1, wherein said measurement electronics comprise temporary contact measurement electronics, wherein said temporary contact measurement electronics comprise brush contact measurement electronics, rolling contact measurement electronics, or sliding contact measurement electronics.

38. The method according to claim 1, wherein a region within said CUT is tested, wherein positive and negative outputs leads of a string of photovoltaic cells arranged in series are connected to said measurement electronics, wherein a DC bias voltage is applied to said string of said photovoltaic cells, wherein a DC current and a pulsed or AC photocurrent are measured, wherein a DC light bias system is used to illuminate all said photovoltaic cells in said string of said photovoltaic cells at an illumination that is more than an illumination of said individual photovoltaic cells under test, wherein said CUT becomes a current limiting device in said string of said illuminated photovoltaic cells.

39. The method according to claim 38, wherein a separate DC light bias is directed to be coincident with the location of the QE measurement of said CUT, wherein said second light bias fills traps capable of inducing a QE response to be non-linear at weak illumination levels.

40. The method according to claim 1, wherein said light probe is configured to form a focused spot.

41. The method according to claim 40, wherein said light probe is configured for scanning by moving said CUT on a stage.

42. The method according to claim 40, wherein said light probe is configured to illuminate an entire area of said CUT, wherein an average spectral response for said CUT is determined.

* * * * *